US011323861B2

(12) United States Patent
Toyoda et al.

(10) Patent No.: US 11,323,861 B2
(45) Date of Patent: May 3, 2022

(54) IN-VEHICLE COMMUNICATION SYSTEM

(71) Applicant: YAZAKI CORPORATION, Tokyo (JP)

(72) Inventors: Ryoma Toyoda, Makinohara (JP); Kunihiko Yamada, Makinohara (JP); Terumitsu Sugimoto, Makinohara (JP); Masashi Suzuki, Makinohara (JP); Kenichi Katsumata, Makinohara (JP); Jun Goto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 22 days.

(21) Appl. No.: 16/874,543

(22) Filed: May 14, 2020

(65) Prior Publication Data

US 2020/0396577 A1 Dec. 17, 2020

(30) Foreign Application Priority Data

Jun. 14, 2019 (JP) .............................. JP2019-111214

(51) Int. Cl.
*H04W 4/48* (2018.01)
*H04W 52/02* (2009.01)
*H04W 88/02* (2009.01)

(52) U.S. Cl.
CPC ......... *H04W 4/48* (2018.02); *H04W 52/0203* (2013.01); *H04W 88/02* (2013.01)

(58) Field of Classification Search
CPC .... H04W 4/48; H04W 52/0203; H04W 88/02
See application file for complete search history.

(56) References Cited

U.S. PATENT DOCUMENTS

| | | | |
|---|---|---|---|
| 2004/0227402 A1 | 11/2004 | Fehr et al. | |
| 2015/0372975 A1 | 12/2015 | Moriya et al. | |
| 2016/0059708 A1 | 3/2016 | Iwasaki et al. | |
| 2017/0015262 A1* | 1/2017 | Kikuchi | B60R 16/033 |
| 2017/0080883 A1* | 3/2017 | Yasunori | H02J 7/0063 |
| 2018/0001848 A1 | 1/2018 | Shiratori et al. | |
| 2019/0310317 A1* | 10/2019 | Elend | H04L 12/40 |

FOREIGN PATENT DOCUMENTS

| | | |
|---|---|---|
| JP | 2014-165641 A | 9/2014 |
| JP | 2018-1861 A | 1/2018 |

\* cited by examiner

*Primary Examiner* — Wayne H Cai
(74) *Attorney, Agent, or Firm* — Kenealy Vaidya LLP

(57) ABSTRACT

An in-vehicle communication system including independent communication hub devices each incorporating a function of relaying communication and a function of controlling a communication path among a plurality of communication connectors, in which each of the communication hub devices includes an internal power supply unit configured to generate, based on input power supply power supplied from a main power supply on a vehicle side, stabilized power supply power necessary for operation of an internal circuit, and a backup power supply output unit configured to supply the input power supply power or the stabilized power supply power generated by the internal power supply unit to the other communication hub device as backup power, in which a backup power supply line is provided which connects the backup power supply output units of the plurality of communication hub devices.

4 Claims, 3 Drawing Sheets

IN-VEHICLE COMMUNICATION SYSTEM

CROSS REFERENCE TO RELATED APPLICATIONS

This application is based on and claims priority from Japanese patent application No. 2019-111214 filed on Jun. 14, 2019, the entire contents of which are incorporated herein by reference.

BACKGROUND OF THE INVENTION

1. Technical Field

The present invention relates to an in-vehicle communication system.

2. Background Art

A vehicle such as an automobile generally includes an in-vehicle battery as a main power supply. Further, an alternator (generator) is provided for charging the in-vehicle battery. Then, DC power supply power is supplied from the main power supply to a large number of various electrical components mounted on each part of the vehicle, that is, loads. The loads of the vehicle are used to constantly or as necessary to implement various functions such as running, steering, stopping, opening and closing of a door, lighting, and communication of the vehicle, and require a supply of power supply power.

In order to supply power mainly from the main power supply to the electrical components on the vehicle, the main power supply and the electrical components are electrically connected via a wire harness. The wire harness is basically an aggregate of a large number of electric wires and generally has a very complicated shape and structure.

In order to distribute the power supply power from the main power supply to a plurality of output-side paths, control on and off of power supply to the loads, and enable protection of the power supply, the loads, and the like, an electric connection box is generally connected to an intermediate portion of the wire harness. As a typical electric connection box, a junction block (J/B), a relay box (R/B), and the like are known.

In recent vehicles, it is necessary to transmit signals and data among a large number of electronic control units (ECUs), switches, sensors, and the like mounted on various places on the vehicle. Therefore, various communication lines used for transmission of the signals and the data are often assembled into the same wire harness (W/H).

An example of information transmission on a vehicle is disclosed in Patent Document JP-A-2014-165641. In a configuration shown in FIG. 3 of Patent Document JP-A-2014-165641, as described in a paragraph [0053], an information system bus 20 includes a communication bus 21 conforming to an Ethernet (registered trademark) standard, and is connected via the communication bus 21 to enable communication with a DMZ 60 based on an IP. An ECU 211 and two ECUs 213 and 214 via an Ethernet switch 212 are connected to the communication bus 21. The Ethernet switch 212 is a switching hub and distributes a communication message from the DMZ 60 input via the communication bus 21 to an ECU (213 or 214) that is a transmission destination of the communication message.

SUMMARY

For example, in consideration of mounting an automatic driving function or the like on a vehicle, it is assumed that an Ethernet is used or a switching hub is installed as disclosed in Patent Document 1 to enable transmission of various pieces of information on the vehicle.

For example, it is assumed that light detection and ranging (LiDAR) sensors are respectively installed at various places of a vehicle body, and signals of the LiDAR sensors are sent to an ECU installed on a central portion of the vehicle body or the like by using the Ethernet for transmission. In such a case, the switching hub is used for relaying an Ethernet signal and controlling a path. In particular, when performance of the LiDAR sensors is increased or the number of installations of the LiDAR sensors is increased, it is considered that the use of the switching hub is indispensable because a communication path becomes complicated.

However, an electronic device such as a switching hub requires a supply of power supply power for operation of the electronic device, and a supply of a stable power supply voltage is further indispensable. Therefore, it is assumed that power of a main power supply is supplied to the switching hub via a power supply line of a wire harness. Further, it is also assumed that a special stabilized power supply circuit is provided for operation of the switching hub.

On the other hand, in a vehicle that requires various electronic devices as in the case where the automatic driving function is mounted, it is necessary to consider that the supply of the power supply power to electronic devices of various parts of the vehicle is not interrupted in various driving situations. For example, even when a collision accident of the own vehicle occurs, it is necessary that the signals of the LiDAR sensors are correctly transmitted and the ECU correctly grasps a situation based on the transmitted signal to ensure safety.

However, when the wire harness is routed near a vehicle body portion subjected to the collision, it is assumed that the power supply line of the wire harness cannot be used due to an influence of the collision. Then, when the power supply line of the wire harness is disconnected, the supply of the power supply power to the switching hub is stopped, and the signals of the LiDAR sensors cannot be transmitted.

The present invention has been made in view of the above-described circumstances, and an object thereof is to provide an in-vehicle communication system that can prevent transmission of important signals and information from being stopped even when an abnormality occurs in a supply path of power supply power due to an influence of a vehicle collision or the like.

In order to achieve the above object, the in-vehicle communication system according to the present invention is characterized by the following (1) to (4).

(1) An in-vehicle communication system including a plurality of independent communication hub devices each incorporating a function of relaying communication and a function of controlling a communication path among a plurality of communication connectors, in which each of the plurality of communication hub devices includes an internal power supply unit configured to generate, based on input power supply power supplied from a main power supply on a vehicle side, stabilized power supply power necessary for operation of an internal circuit, and a backup power supply output unit configured to supply the input power supply power or the stabilized power supply power generated by the internal power supply unit to the other communication hub device as backup power, in which a backup power supply line is provided which connects the backup power supply output units of the plurality of communication hub devices.

(2) The in-vehicle communication system according to the above (1), including:

an inter-hub communication line that connects the plurality of communication hub devices, in which the inter-hub communication line is assembled into a wire harness in a routed state where the inter-hub communication line is parallel to the backup power supply line.

(3) The in-vehicle communication system according to the above (1), in which the plurality of communication hub devices are connected to the main power supply via a plurality of input-side power supply lines having at least independent fuse functions and different routing paths.

(4) The in-vehicle communication system according to the above (2), in which the plurality of communication hub devices are arranged near a center of a vehicle body in a width direction and separated in a front-rear direction of the vehicle body, and the inter-hub communication line and the backup power supply line are routed in the front-rear direction of the vehicle body while passing through a vicinity of the center of the vehicle body in the width direction.

According to the in-vehicle communication system having the configuration of the above (1), even when a supply path of power supply power cannot be normally used due to an influence of a vehicle collision or the like, transmission of important signals and information can be prevented from being stopped. That is, when a supply of the power supply power from the main power supply on a vehicle side to a first communication hub device is stopped due to damage to the wire harness, the power supply power can be supplied from a second communication hub device to the first communication hub device via the backup power supply output unit and the backup power supply line. Therefore, communication functions of both communication hub devices can be maintained.

According to the in-vehicle communication system having the configuration of the above (2), since the inter-hub communication line and the backup power supply line are routed in parallel, complicating a routing path and a shape of the wire harness can be avoided. Further, the inter-hub communication line and the backup power supply line are integrated, so that it is easy to protect an integrated portion from being damaged.

According to the in-vehicle communication system having the configuration of the above (3), even when an electric wire or a fuse is disconnected in a path of one of the plurality of input-side power supply lines, power of the main power supply can be supplied to one communication hub device by using the other path. Then, the power supply power can be continuously supplied to the other communication hub device via the backup power supply line.

According to the in-vehicle communication system having the configuration of the above (4), since the inter-hub communication line and the backup power supply line pass through the vicinity of the center of the vehicle body in the width direction, an impact received when the vehicle collides can be reduced. That is, since the wire harness passes through a place separated from front, rear, left and right end portions of the vehicle body, an influence of an impact applied to the vehicle from outside is unlikely to occur, and communication functions can be easily maintained.

According to the in-vehicle communication system of the present invention, even when a situation occurs in which the supply path of the power supply power cannot be normally used due to the influence of the vehicle collision or the like, the transmission of the important signals and the information can be easily prevented from being stopped.

The present invention is briefly described above. Details of the present invention are further clarified by reading a mode for carrying out the invention (hereinafter, referred to as "embodiment") described below with reference to the attached drawings.

DETAILED DESCRIPTION OF EMBODIMENTS

A specific embodiment according to the present invention will be described below with reference to the drawings.

<Layout Outline of Vehicle>

Figure 1:
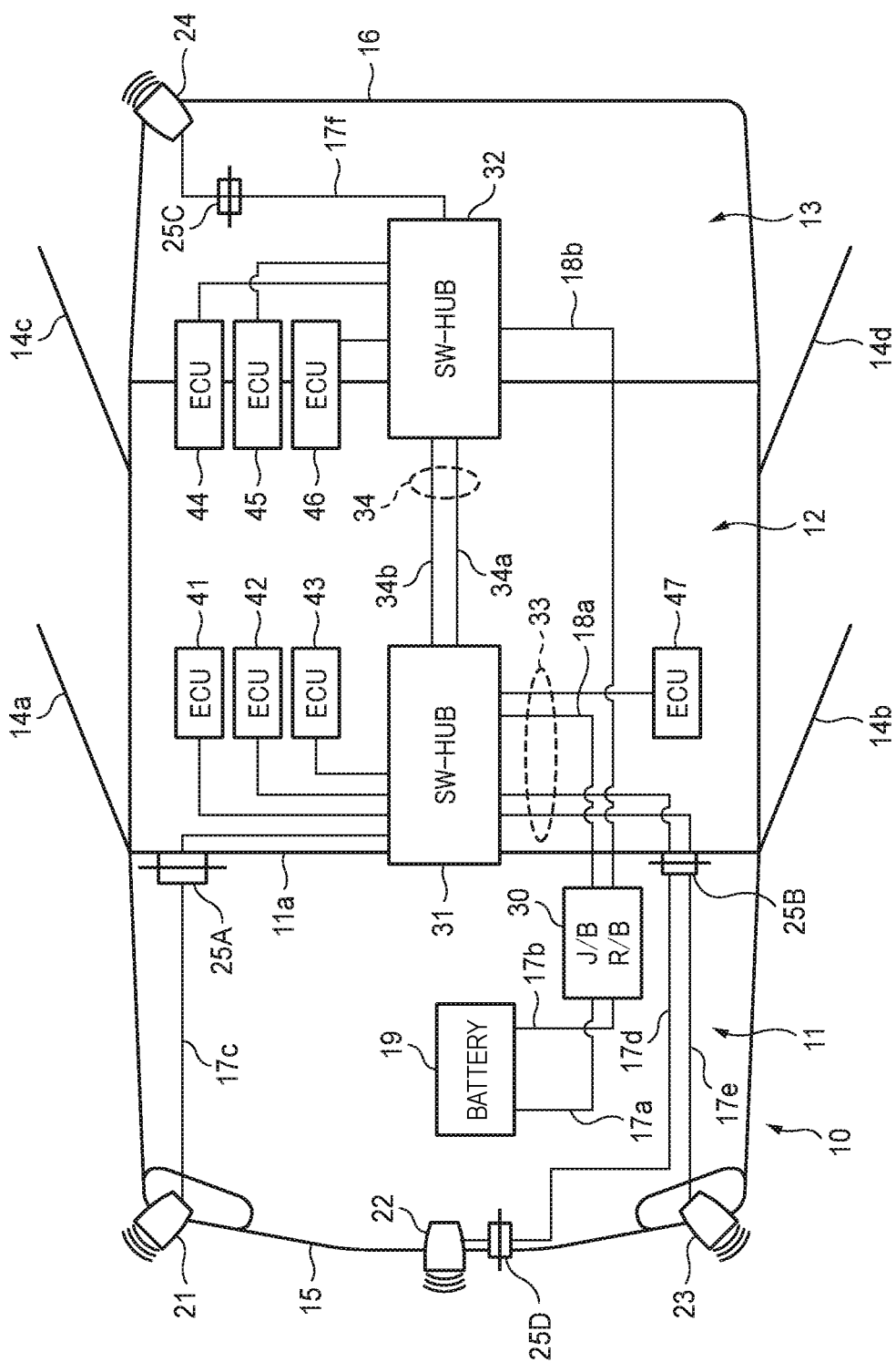
FIG. 1 is a plan view showing a layout outline of main components on a vehicle on which an in-vehicle communication system is mounted.

FIG. 1 is a plan view showing a layout outline of main components on a vehicle 10 on which an in-vehicle communication system is mounted. In the figure, a left side represents a front side of the vehicle and a right side represents a rear side.

As shown in FIG. 1, inside of the vehicle 10 is roughly divided into three sections: an engine room 11, a passenger compartment 12, and a luggage compartment 13. An in-vehicle battery 19 serving as a main power supply is installed in the engine room 11. A wire harness including a +B power supply line 17a and an IG power supply line 17b is connected to the in-vehicle battery 19 in the engine room 11.

The +B power supply line 17a is directly connected to the in-vehicle battery 19, and can supply, for example, power supply power (+B) of a DC voltage 12 [V] to an output side. Further, the IG power supply line 17b can supply the power supply power to the output side when the ignition switch is turned on, in conjunction with on or off of the ignition (IG) switch.

In the configuration shown in FIG. 1, the +B power supply line 17a and the IG power supply line 17b are connected to an input side of an electric connection box 30. Further, the electric connection box 30 incorporates a function of a junction block J/B and a function of a relay box R/B in a box-shaped housing.

A wire harness including +B power supply lines 18a and 18b of two systems is connected to an output side of the electric connection box 30. The +B power supply lines 18a and 18b of the two systems respectively include independent fuse circuits. DC power supply power can be supplied from the output side of the electric connection box 30 to various electrical components on the vehicle 10 via the +B power supply lines 18a and 18b and the like provided in a wire harness 33.

As shown in FIG. 1, a hub device 31 is installed near a center in a width direction on a front side of the passenger compartment 12. Further, a hub device 32 is installed near a center in the width direction on a front side of the luggage compartment 13. Further, a wire harness of an inter-hub connection unit 34 that connects these hub devices 31 and 32 is linearly routed on a floor in a front-rear direction of a vehicle body. A wire harness of the inter-hub connection unit 34 includes a backup power supply line 34a and a communication line 34b, which are routed to be parallel to each other between the passenger compartment 12 and the luggage compartment 13 in the front-rear direction.

The hub devices 31 and 32 correspond to communication of an Ethernet standard, and have a function of relaying communication and a function of switching a communication path. In order to supply the power supply power from the main power supply to the hub device 31, the +B power supply line 18a is connected to the hub device 31. Further in order to supply the power supply power from the main power supply to the hub device 32, the +B power supply line 18b is connected to the hub device 32. Further, the respective +B power supply lines 18a and 18b are routed such that a path of the wire harness does not overlap with the inter-hub connection unit 34.

For example, when the vehicle 10 collides and a vehicle body is damaged, disconnection or the like may occur in the wire harness. However, the hub devices 31 and 32 of the two systems are installed at positions separated from each other in the front-rear direction. Therefore, it is extremely unlikely that the +B power supply line 18a that supplies the power supply power to the hub device 31 and the +B power supply line 18b that supplies the power supply power to the hub device 32 are disconnected at the same time. Further, since the wire harness of the inter-hub connection unit 34 is routed near a center of the vehicle 10, disconnection during a collision of the vehicle 10 is extremely unlikely to occur.

Further, as will be described in detail below, the hub devices 31 and 32 are connected to each other via the backup power supply line 34a. Therefore, even when either one of the +B power supply lines 18a and 18b of the two systems is disconnected, a supply of the power supply power to both hub devices 31 and 32 can be maintained. For example, when the +B power supply line 18a is disconnected, the power supply power is supplied to the hub device 32 via the +B power supply line 18b, and the hub device 32 supplies the power supply power to the hub device 31 via the backup power supply line 34a. Further, the reverse is also possible.

In the vehicle 10, light detection and ranging (LiDAR) devices 21, 22, 23, and 24 are respectively installed at a right end, a center, and a left end of a vehicle body front portion 15 and at a right end of a vehicle body rear portion 16 to correspond to an automatic driving function.

As shown in FIG. 1, a communication line 17c of the LiDAR device 21 passes through a routing path on a right side in the engine room 11, and is connected to the hub device 31 via a relay connector 25A. Further, a communication line 17d of the LiDAR device 22 passes through a relay connector 25D, passes through a routing path on a left side in the engine room 11, and is connected to the hub device 31 via a relay connector 25B. A communication line 17e of the LiDAR device 23 passes through the routing path on the left side in the engine room 11, and is connected to the hub device 31 via the relay connector 25B. A communication line 17f of the LiDAR device 24 passes through the luggage compartment 13 via a relay connector 25C, and is connected to the hub device 32.

Various electrical components 41 to 47 are mounted on the vehicle 10. The electrical components 41 to 47 have configurations and functions such as a dedicated communicator (DCM: Data Communication Module), a meter unit, a central gateway, an ADX, an electronic control unit of an automatic driving system (ADS), an electronic control unit of SIS, and a data link connector (DLC). The central gateway performs data and protocol conversion among a plurality of networks (CAN and the like) on the vehicle 10, and provides a function serving as a center of vehicle information management.

In the example of FIG. 1, communication lines of the electrical components 41, 42, 43, and 47 installed on a vehicle body front side are connected to the hub device 31 that is at a position close to each communication line. Further, communication lines of the electrical components 44, 45, and 46 installed on a vehicle body rear side are connected to the hub device 32 that is at a position close to each communication line.

When the LiDAR devices 22 to 24 are connected by an Ethernet communication line, an influence of signal attenuation and the like increases as a distance of the communication line increases. Therefore, as shown in FIG. 1, each of the relay connectors 25A, 25B, 25C, and 25D is connected in the middle of a communication line to relay communication.

Configuration Example—1 of In-Vehicle Communication System

Figure 2:
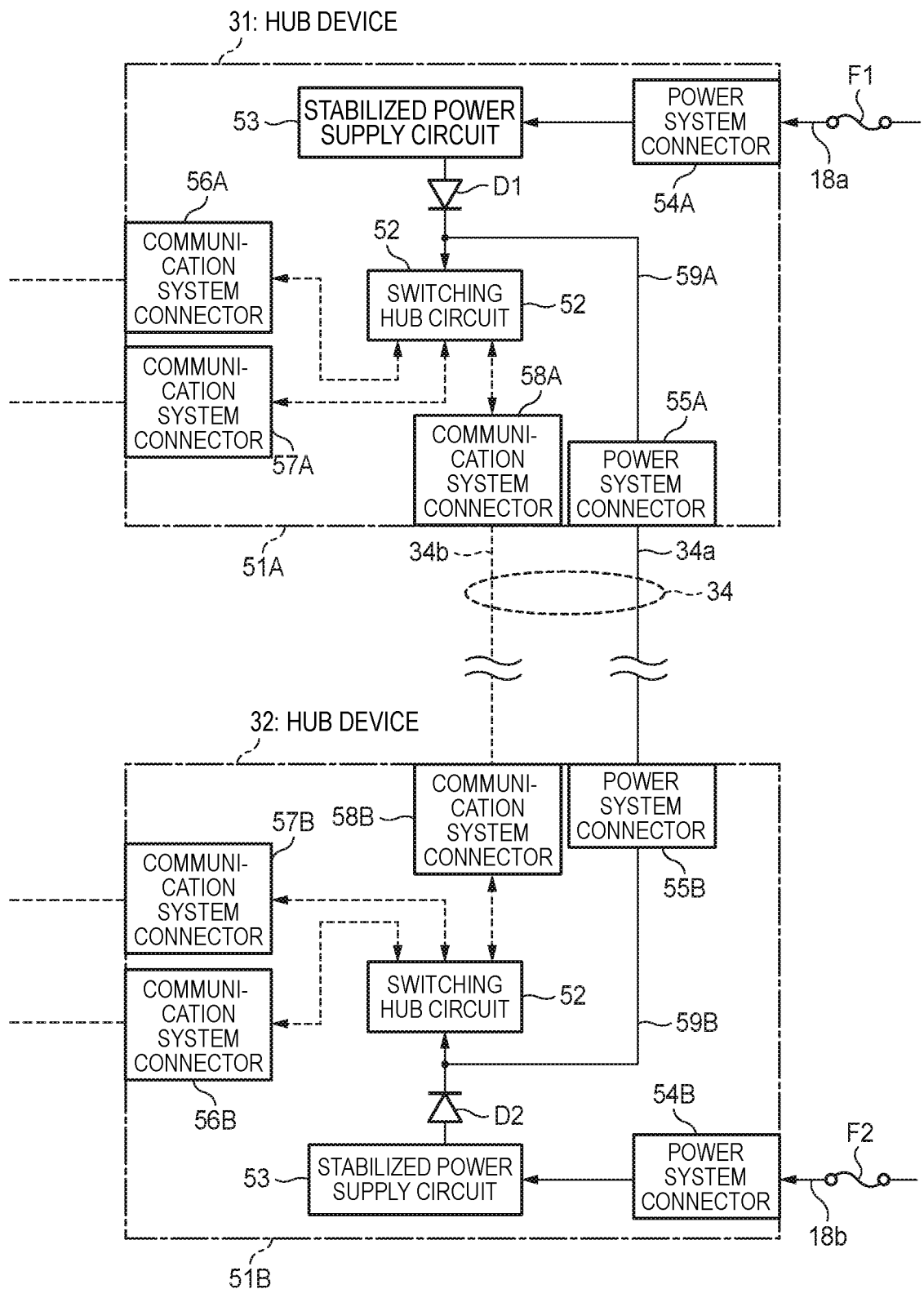
FIG. 2 is a block diagram showing a configuration example-1 of main parts of the in-vehicle communication system.

FIG. 2 is a block diagram showing a configuration example-1 of main parts of the in-vehicle communication system.

The in-vehicle communication system shown in FIG. 2 includes two hub devices 31 and 32. These hub devices 31 and 32 are installed on the vehicle 10, for example, in a state of being separated from each other as shown in FIG. 1, and connected to each other via the inter-hub connection unit 34.

A switching hub circuit 52 and a stabilized power supply circuit 53 are housed in a housing 51A of the hub device 31, and the switching hub circuit 52 and the stabilized power supply circuit 53 are housed in a housing 51B of the hub device 32. The switching hub circuit 52, similar to a general switching hub, has a function of relaying communication corresponding to communication of an Ethernet standard and of switching a communication path.

The stabilized power supply circuit 53 supplies stable DC power supply power (voltage, for example, +5 [V]) necessary for operation of the switching hub circuit 52 based on power of the main power supply. A backflow prevention circuits D1 is connected between the stabilized power supply circuit 53 and the switching hub circuit 52, and a backflow prevention circuit D2 is connected between the stabilized power supply circuit 53 and the switching hub circuit 52. The backflow prevention circuits D1 and D2 are configured with diodes.

The hub device 31 includes a power system connector 54A for connecting to a wire harness including the +B power supply line 18a. Further, the hub device 31 includes a power system connector 55A and a communication system connector 58A for connecting to the wire harness of the inter-hub connection unit 34. Furthermore, the hub device 31 includes a plurality of communication system connectors 56A and 57A for connecting to the communication lines of the various electrical components.

The switching hub circuit 52 in the hub device 31 can relay Ethernet communication among paths of the communication system connectors 56A, 57A, and 58A, or switch a communication path. The +B power supply line 18a including a fuse F1 is connected to the power system connector 54A. The fuse F1 is disposed, for example, in the electric connection box 30.

The power of the main power supply supplied from the +B power supply line 18a to the hub device 31 is supplied to the stabilized power supply circuit 53 via the power system connector 54A. The stabilized power supply circuit 53 generates stable DC power based on the power of the main power supply supplied from the +B power supply line 18a. The stable DC power generated by the stabilized power supply circuit 53 is supplied to the switching hub circuit 52 via the backflow prevention circuit D1.

For example, when the +B power supply line 18a is disconnected or the fuse F1 is disconnected, the stabilized power supply circuit 53 in the hub device 31 cannot generate the power supply power. However, in a state where the other hub device 32 operates normally, the necessary power supply power appears in the backup power supply line 34a. Therefore, the power supply power is also supplied to the switching hub circuit 52 in the hub device 31 via the power system connector 55A and the backup power supply line 59A.

The hub device 32, similar to the hub device 31, includes a power system connector 54B for connecting to a wire harness including the +B power supply line 18b. Further, the hub device 32 includes a power system connector 55B and a communication system connector 58B for connecting to the wire harness of the inter-hub connection unit 34. Furthermore, the hub device 32 includes a plurality of communication system connectors 56B and 57B for connecting to the communication lines of the various electrical components.

The switching hub circuit 52 in the hub device 32 can relay Ethernet communication among paths of the communication system connectors 56B, 57B, and 58B, or switch a communication path. The +B power supply line 18b including a fuse F2 is connected to the power system connector 54B. The fuse F2 is disposed, for example, in the electric connection box 30.

The power of the main power supply supplied from the +B power supply line 18b to the hub device 32 is supplied to the stabilized power supply circuit 53 via the power system connector 54B. The stabilized power supply circuit 53 generates stable DC power based on the power of the main power supply supplied from the +B power supply line 18b. The stable DC power generated by the stabilized power supply circuit 53 is supplied to the switching hub circuit 52 via the backflow prevention circuit D2.

For example, when the +B power supply line 18b is disconnected or the fuse F2 is disconnected, the stabilized power supply circuit 53 in the hub device 32 cannot generate the power supply power. However, in a state where the other hub device 31 operates normally, the necessary power supply power appears in the backup power supply line 34a. Therefore, the power supply power is also supplied to the switching hub circuit 52 in the hub device 32 via the power system connector 55B and the backup power supply line 59B.

That is, even when either one of the +B power supply lines 18a and 18b of the two systems is disconnected, or the fuse F1 or F2 is disconnected, the power supply power can be supplied to the switching hub circuit 52 in each of the hub devices 31 and 32 via the +B power supply line 18a or 18b in the remaining system and via the backup power supply line 34a. Therefore, even during an abnormality such as a collision, communication functions of both hub devices 31 and 32 can be maintained, and generation of an unusable communication path can be prevented.

Configuration Example—2 of In-Vehicle Communication System

Figure 3:
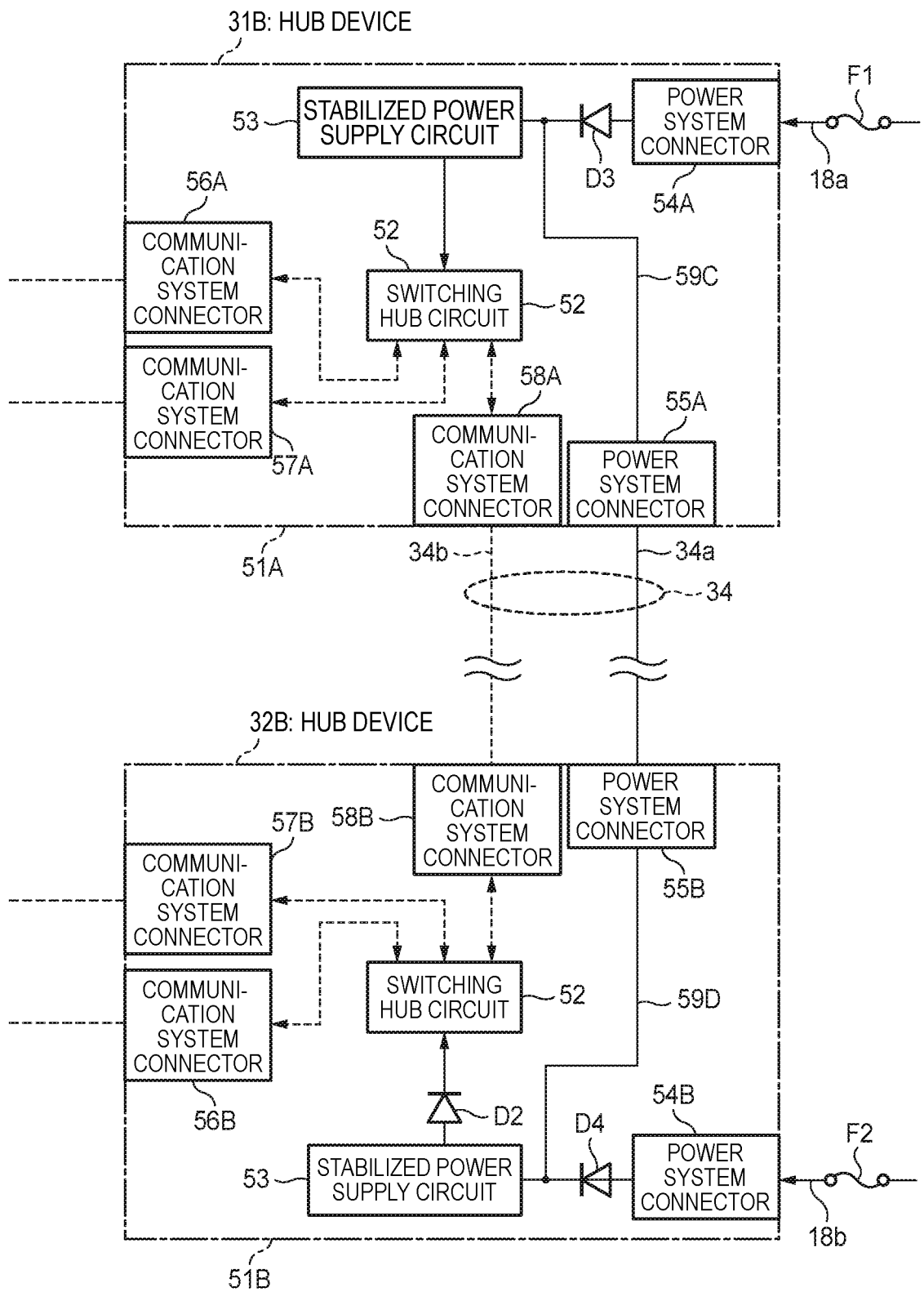
FIG. 3 is a block diagram showing a configuration example-2 of main parts of the in-vehicle communication system.

FIG. 3 is a block diagram showing a configuration example-2 of main parts of an in-vehicle communication system. The in-vehicle communication system shown in FIG. 3 is a modification of the in-vehicle communication system in FIG. 2. In FIGS. 2 and 3, common components are denoted by the same reference numerals.

As in the in-vehicle communication system of FIG. 2, the in-vehicle communication system shown in FIG. 3 includes two hub devices 31B and 32B, and the two hub devices 31B and 32B are connected to each other via the inter-hub connection unit 34. A wire harness of the inter-hub connection unit 34 includes the backup power supply line 34a and the communication line 34b.

The hub device 31B in FIG. 3, similar to the hub device 31, incorporates the switching hub circuit 52, the stabilized power supply circuit 53, the power system connectors 54A and 55A, and the communication system connectors 56A, 57A, and 58A. Further, the hub device 32B in FIG. 3 incorporates the switching hub circuit 52, the stabilized power supply circuit 53, the power system connectors 54B and 55B, and the communication system connectors 56B, 57B, and 58B.

In the hub device 31B, output of the power system connector 54A is connected to input of the stabilized power supply circuit 53 via the backflow prevention circuit D3, and output of the stabilized power supply circuit 53 is directly connected to power supply input of the switching hub circuit 52. Further, output of the backflow prevention circuit D3 is connected to the power system connector 55A via the backup power supply line 59C.

Similarly, in the hub device 32B, output of the power system connector 54B is connected to input of the stabilized power supply circuit 53 via the backflow prevention circuit D4, and output of the stabilized power supply circuit 53 is directly connected to power supply input of the switching hub circuit 52. Further, output of the backflow prevention circuit D4 is connected to the power system connector 55B via the backup power supply line 59D.

That is, in a case of the in-vehicle communication system shown in FIG. 2, the stable power supply power generated by the internal stabilized power supply circuit 53 passes through the backup power supply line 34a. However, in a case of the in-vehicle communication system in FIG. 3, power supply power of a main power supply input to the stabilized power supply circuit 53 is configured to pass through the backup power supply line 34a.

In the hub device 31B in FIG. 3, for example, when the +B power supply line 18a is disconnected or the fuse F1 is disconnected, the power supply power cannot be supplied to input of the stabilized power supply circuit 53 in the hub device 31B via a path passing through the power system connector 54A and the backflow prevention circuit D3. However, in a state where the other hub device 32B operates normally, the power of the main power supply is supplied from the hub device 32B to input of the stabilized power supply circuit 53 via the backup power supply line 34a, the power system connector 55A, and the backup power supply line 59C. Therefore, the stabilized power supply circuit 53 in the hub device 31B can continuously generate stable power supply power and can supply the power supply power to the switching hub circuit 52 in the hub device 31B.

In the hub device 32B, for example, when the +B power supply line 18b is disconnected or the fuse F2 is disconnected, the power supply power cannot be supplied to input of the stabilized power supply circuit 53 in the hub device 32B via a path passing through the power system connector 54B and the backflow prevention circuit D4. However, in a state where the other hub device 31B operates normally, the power of the main power supply is supplied from the hub device 31B to input of the stabilized power supply circuit 53 via the backup power supply line 34a, the power system connector 55B, and the backup power supply line 59D. Therefore, the stabilized power supply circuit 53 in the hub device 32B can continuously generate stable power supply power and can supply the power supply power to the switching hub circuit 52 in the hub device 32B.

That is, even when either one of the +B power supply lines 18a and 18b of two systems is damaged and disconnected, or the fuse F1 or F2 is disconnected, the power supply power can be supplied to the stabilized power supply circuit 53 in each of the hub devices 31B and 32B via the +B power supply line 18a or 18b of the remaining system and via the backup power supply line 34a. Therefore, even during an abnormality such as a collision, communication functions of both hub devices 31 and 32 can be maintained, and generation of an unusable communication path can be prevented.

As described above, in the in-vehicle communication system shown in FIG. 2, even when the stabilized power supply circuit 53 of one of the two hub devices 31 and 32 cannot supply power to output, power output by the stabilized power supply circuit 53 of the other hub device 32 or 31 can be supplied via the backup power supply line 34a. Therefore, functions of both hub devices 31 and 32 can be maintained.

In the in-vehicle communication system shown in FIG. 3, even when power supply power is not supplied from the power system connector 54A or 54B in one of the two hub devices 31B and 32B, power of a main power supply output by the backflow prevention circuit D4 or D3 of the other hub device 32B or 31B can be supplied to input of the stabilized power supply circuit 53 via the backup power supply line 34a. Therefore, in any of the hub devices 31B and 32B, the stabilized power supply circuit 53 can continue outputting the stable power supply power and can maintain functions of both hub devices 31 and 32.

In a case where the independent +B power supply lines 18a and 18b of the two systems are routed as in the vehicle 10 shown in FIG. 1, even when a wire harness is damaged during a collision of the vehicle 10, it is easy to avoid disconnection of both +B power supply lines 18a and 18b of the two systems at the same time. Further, when the +B power supply lines 18a and 18b of the two systems are respectively connected to the hub devices 31 and 32, even when one of the +B power supply lines 18a and 18b of the two systems is disconnected, communication functions of both hub devices 31 and 32 can be maintained since the backup power supply line 34a can be used.

As shown in FIG. 1, the wire harness, in a state where the backup power supply line 34a and the communication line 34b are parallel to each other, is linearly routed in the front-rear direction near the center of the vehicle body of the vehicle 10. Thereby, resistance to an external impact caused by a collision or the like may be increased, and reliability of a communication system can be improved.

Here, features of the in-vehicle communication system according to the embodiment of the present invention described above will be briefly summarized in the following [1] to [4].

[1] An in-vehicle communication system including a plurality of independent communication hub devices (hub devices 31 and 32) each incorporating a function of relaying communication and a function of controlling a communication path among a plurality of communication connectors, in which each of the plurality of communication hub devices includes an internal power supply unit (stabilized power supply circuit 53) configured to generate, based on input power supply power supplied from a main power supply (in-vehicle battery 19) on a vehicle side, stabilized power supply power necessary for operation of an internal circuit, and a backup power supply output unit (power system connectors 55A and 55B) configured to supply the input power supply power or the stabilized power supply power generated by the internal power supply unit to the other communication hub device as backup power, in which a backup power supply line (34a) is provided which connects the backup power supply output units of the plurality of communication hub devices.

[2] The in-vehicle communication system according to the above [1] includes:

an inter-hub communication line (communication line 34b) that connects the plurality of communication hub devices, in which the inter-hub communication line is assembled into a wire harness (inter-hub connection unit 34) in a routed state where the inter-hub communication line is parallel to the backup power supply line (see FIG. 1).

[3] The in-vehicle communication system according to the above [1], in which the plurality of communication hub devices are connected to the main power supply via a plurality of input-side power supply lines (+B power supply lines 18a and 18b) having at least independent fuse functions (fuses F1 and F2) and different routing paths.

[4] The in-vehicle communication system according to the above [2], in which the plurality of communication hub devices are arranged near a center of a vehicle body in a width direction and separated in a front-rear direction of the vehicle body, and the inter-hub communication line and the backup power supply line are routed in the front-rear direction of the vehicle body while passing through a vicinity of the center of the vehicle body in the width direction (see FIG. 1).

What is claimed is:

1. An in-vehicle communication system, comprising:
a main power supply;
a plurality of independent communication hub devices each incorporating a function of relaying communication and a function of controlling a communication path among a plurality of communication connectors;
a plurality of input-side power supply lines connecting the main power supply to the plurality of communication hub devices in parallel, wherein
each of the plurality of communication hub devices includes
an internal power supply unit configured to generate, based on input power supply power supplied from the main power supply on a vehicle side, stabilized power supply power necessary for operation of an internal circuit, and
a backup power supply output unit configured to supply the input power supply power or the stabilized power supply power generated by the internal power supply unit to the other communication hub device as backup power, wherein
a backup power supply line is provided which connects the backup power supply output units of the plurality of communication hub devices in series.

2. The in-vehicle communication system according to claim 1, further comprising:

an inter-hub communication line that connects the plurality of communication hub devices in series, wherein
the inter-hub communication line is assembled into a wire harness in a routed state where the inter-hub communication line is parallel to the backup power supply line.

3. The in-vehicle communication system according to claim 1, wherein
each of the plurality of input-side power supply lines has at least an independent fuse function and a respective routing path, and the routing paths are different from each other.

4. The in-vehicle communication system according to claim 2, wherein
the plurality of communication hub devices are arranged near a center of a vehicle body in a width direction and separated in a front-rear direction of the vehicle body, and
the inter-hub communication line and the backup power supply line are routed in the front-rear direction of the vehicle body while passing through a vicinity of the center of the vehicle body in the width direction.

* * * * *